Aug. 25, 1925.

Z. C. BLOOMFIELD 1,550,777

MEAT TENDERER

Filed Nov. 6, 1924

Inventor
Zane C. Bloomfield
By Lancaster and Allwine
Attorneys

Patented Aug. 25, 1925.

1,550,777

UNITED STATES PATENT OFFICE.

ZANE C. BLOOMFIELD, OF JACKSONVILLE, FLORIDA.

MEAT TENDERER.

Application filed November 6, 1924. Serial No. 748,184.

*To all whom it may concern:*

Be it known that I, ZANE C. BLOOMFIELD, a citizen of the United States, residing at Jacksonville, in the county of Duval and State of Florida, have invented certain new and useful Improvements in a Meat Tenderer, of which the following is a specification.

The present invention relates to meat tenderers adapted for use in masticating the muscular flesh of meats of various descriptions.

The primary object of the invention being to provide a simple and efficient device of this character which may be struck from sheet metal, stamped, and readily assembled into operative relation to a handle, which may be of wood, metal, or other suitable material.

A further object of the invention is to provide a meat tenderer which is so constructed, that a combined cutting and tearing action will be had when being used, for thoroughly breaking up the sinews in the meat being operated upon.

A further object of the invention is to provide a meat tenderer having a plurality of blades so disposed in angular relation to one another, as to effectively break up the sinews of the meat, regardless of the general direction in which the sinews run with respect to the device.

Other objects and advantages of the invention will be apparent during the course of the following detailed description, taken in connection with the accompanying drawing, forming a part of this specification, and in which drawing:—

Figure 1:
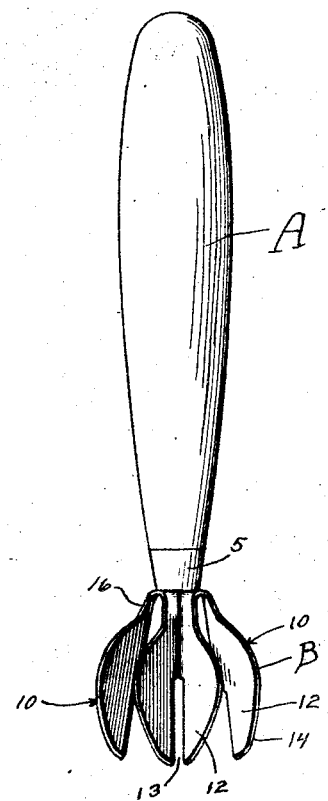
Figure 1 is a side elevation of the device shown assembled into operative relation to a handle.
Figure 2:
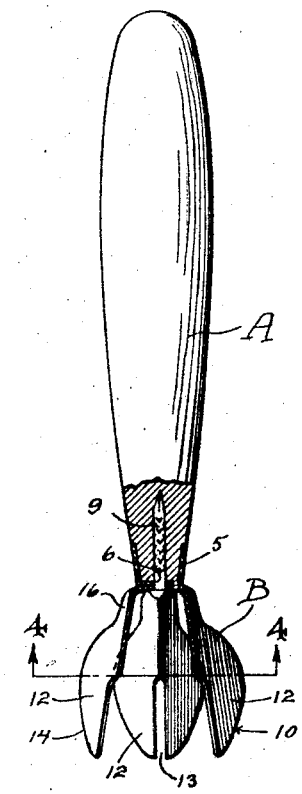
Figure 2 is a central vertical section through the tenderer, and showing the manner of attachment to a handle.
Figure 3:
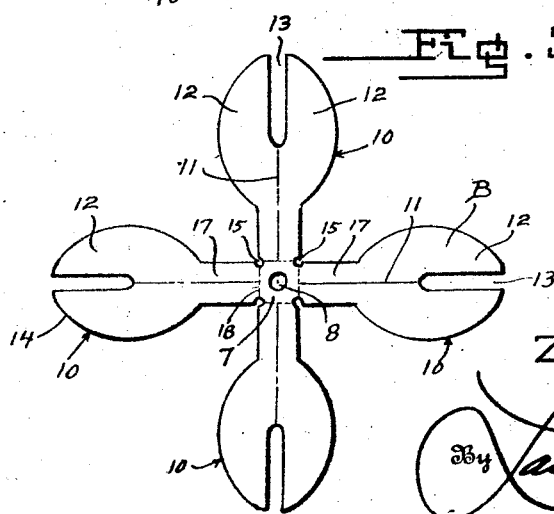
Figure 3 is a plan view of the tenderer prior to being shaped into its finished form; and, Figure 4 is a transverse section on line 4—4 of Figure 2, looking in the direction of the arrows.
Figure 4:
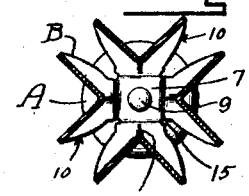

Referring to the drawing in detail, wherein for the purpose of illustration is shown but the preferred embodiment of the invention, and wherein similar reference characters designate corresponding parts throughout the several views; the letter A may designate a handle of any approved character, and B the improved tenderer secured to one end of the handle A.

The handle A, which may be formed of wood, has fitted about its lower end a ferrule or cap 5 having an aperture 6 provided therein in axial alignment with the major axis of the handle.

Referring now to the tenderer B, which is preferably made from sheet metal of a non-corrosive nature, the same includes a head or hub like portion 7 which may be square or polygonal shaped in plan, and which is provided with an axially disposed aperture 8 through which a fastening element 9 may extend for securing the tenderer to a handle portion of any desired shape. Depending in an outwardly inclined direction from each longitudinal edge of the head 7, are prongs 10 which are bent outwardly along their central vertical axis as at 11, for providing angularly disposed blade portions 12 which are partially divided at their lower ends by a central vertically extending slot 13 opening at the lowermost portion of the prongs.

These blade portions 12 have their outer edges arcuated as at 14, and have their inner intersecting edges where the bend 11 occurs, disposed nearer to the axial center of the device in a manner whereby the prongs will lie in pocketed relation to one another with a blade portion 12 of one prong lying in substantially a parallel plane with the adjacent blade portion. By so bending the prongs outwardly away from the axial center of the device, permits of larger blade portions being had than would be possible were the prongs bent in the opposite direction, without enlarging the general diameter of the device to an undesirable size.

The intersecting corners of each prong 10 with the hub portion 7, are recessed as at 15, so that when the prongs are bent outwardly along the central or bending line 11, angular flanges 16 will be formed on each longitudinal edge of the reduced connecting portions 17, for reinforcing the portions 17 and causing the prongs to yield outwardly along the bending lines 18 when a striking blow is made with the device. Thus it will be seen that when striking a piece of meat with the device, the arcuate edges of the blades 12 will engage the meat with a cutting action, and due to the outwardly inclined relation of the depending prongs 10, a tearing action will also be had since the general tendency of the prongs will be to spread or move from one another.

While the tenderer has been shown as embodying merely four depending prongs, it is to be understood that any desired number of prongs may be provided, and that if desired, a plurality of the tenderers may be attached to a suitable handle as for use in restaurants or such places where large quantities of meats are used.

Various changes may be made to the shape, size, and arrangement of parts herein shown and described, without departing from the spirit of the invention or the scope of the following claims.

I claim:—

1. In a device of the class described, a tenderer comprising a plurality of prongs yieldably connected at their upper ends, and depending with their confronting faces in diverging relation to one another.

2. In a device of the class described, a tenderer comprising a plurality of downwardly diverging prongs yieldably connected at their upper ends, and bent outwardly along their central vertical axis providing angularly disposed blade sections.

3. In a device of the class described, a tenderer comprising a plurality of downwardly diverging prongs bent vertically for forming angularly disposed blade portions, and having one face of each blade portion of one prong lying in confronting relation with one face of the adjacent blade portion of the succeeding prong.

4. In a device of the class described, a tenderer comprising a plurality of downwardly diverging prongs bent vertically for forming blade portions lying in angular relation to one another, said blade portions having their outer edges arcuated and terminating in a point adjacent the bending line of the prongs.

5. A tenderer formed of sheet metal, comprising a flat head provided with an aperture, and having prongs, depending in downwardly diverging relation from each edge of the head, provided with blade portions extending radially of the vertical axis of the tenderer.

6. A tenderer formed of sheet metal, comprising a head portion being square shaped in plan, and having prongs extending downwardly in angular relation from each edge of the head portion, with the intersecting corners of each prong with the head portion, being recessed for permitting of reinforcing flanges being formed at the upper portions of the prongs, and allowing the prongs to yield along their line of connection with the head portion.

ZANE C. BLOOMFIELD.